United States Patent [19]

Taylor

[11] 4,027,136

[45] May 31, 1977

[54] SHEET METAL COLLET

[75] Inventor: Robert Gordon Taylor, Sterling Heights, Mich.

[73] Assignee: USM Corporation, Boston, Mass.

[22] Filed: Nov. 4, 1975

[21] Appl. No.: 628,647

[52] U.S. Cl. .................................. 219/98; 279/41 A
[51] Int. Cl.² .......................................... B23K 9/20
[58] Field of Search ............ 85/87, 88; 219/98, 99; 279/41, 96, 102; 403/369, 374

[56] References Cited

UNITED STATES PATENTS

| 1,450,189 | 4/1923 | Smith ................................. 279/41 |
| 3,582,602 | 6/1971 | Ettinger et al. ....................... 219/98 |
| 3,774,005 | 11/1973 | Spisak ................................ 219/98 |
| 3,837,661 | 9/1974 | Phillippi ........................... 279/41 X |

Primary Examiner—Bruce A. Reynolds
Assistant Examiner—N. D. Herkamp
Attorney, Agent, or Firm—Aubrey C. Brine; Richard B. Megley; Vincent A. White

[57] ABSTRACT

An automatic device for feeding and welding T-profile button studs to a surface is provided with a collet for retaining and aligning an individual stud in place adjacent a workpiece. The collet is formed of relatively thin sheet metal and is effective to properly orient the fastener relative to the workpiece surface while minimizing the occurence or arcing in the area between the collet and the arc shield.

10 Claims, 4 Drawing Figures

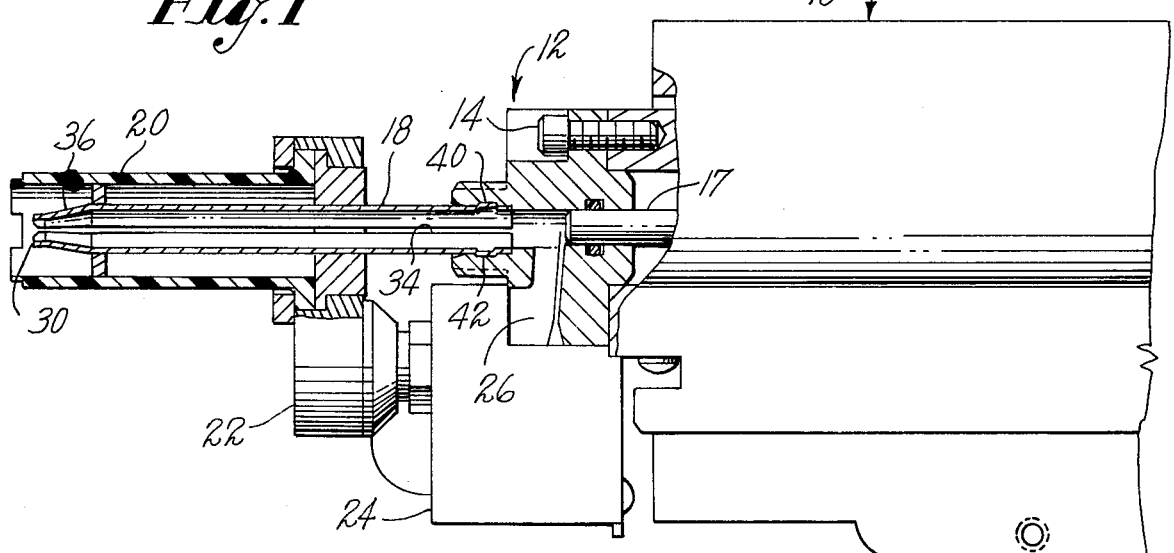
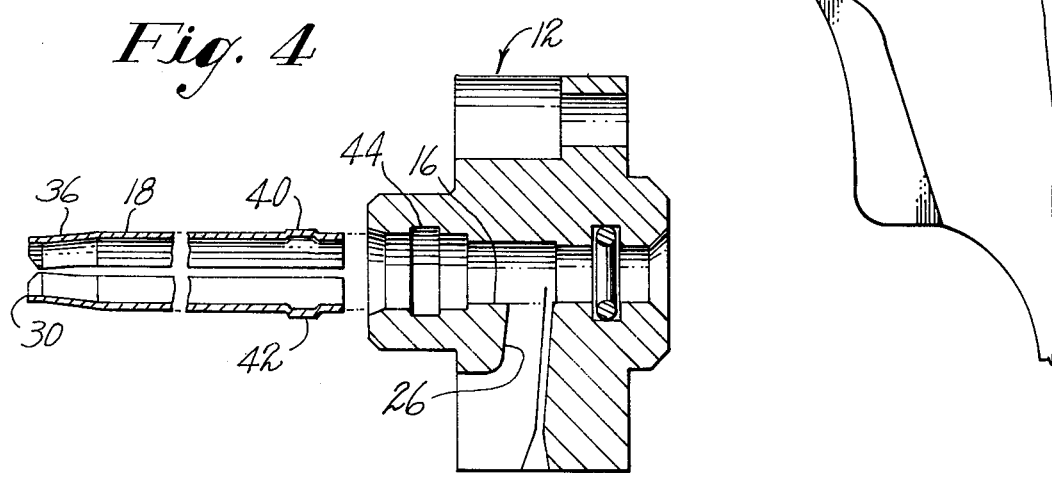
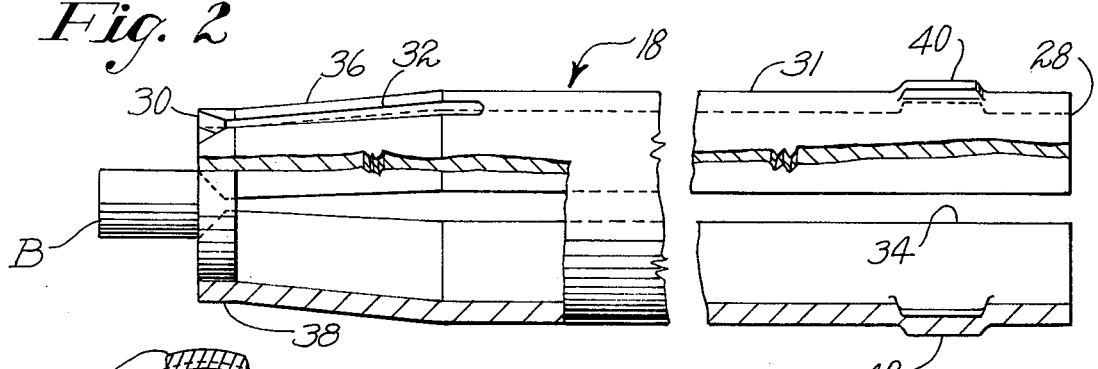
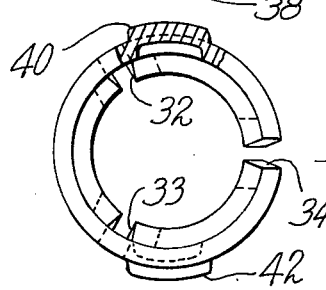

SHEET METAL COLLET

BACKGROUND OF THE INVENTION

The present invention relates to automatic welding devices, and more particularly to a collet for retaining and positioning T-shaped studs adjacent the surface onto which they are to be welded.

In U.S. Pat. No. 3,582,602 issued to Donald H. Ettinger et al. and assigned to the assignee of the present invention, there is shown an automatic portable gun system for repetitively welding relatively small components in the form of T-studs, or buttons, to panel surfaces. In the above cited patent, there is disclosed a welding gun which has a tubular electrode member with a button-holding means at its projecting ends through which buttons are delivered to the holding means for retention during welding. The tubular member disclosed in that device is a relatively heavy-walled metallic member which is machined to provide a collet at the outer end for holding the stud adjacent the workpiece during the welding operation. The collet, as generally provided in such devices, comprises a metallic member which is machined to provide a plurality of close tolerance fingers at the outer end thereof for gripping the button or stud as it is forced into the end of the tubular member, to be held against the work surface.

While these heavy metallic members prove satisfactory in providing a tubular electrode member and chuck, or collet, combination, there are certain drawbacks to this prior art collet arrangement as described in the aforementioned patent.

First, the manufacture of the collet arrangement requires a plurality of machine operations, some of which are to close tolerances in view of the relatively small size stud or button which is used in the automobile industry, for example.

Also, the welding gun is generally provided with an arc shield which surrounds the button at a fixed distance therefrom, in which case the heavy metallic chuck or collet extends very close to the inner dimension of the arc shield providing little clearance therewith. Over a period of time, the large frontal area of the collet collects a buildup of weld material often called "splatter". When a sufficient quantity of this material collects, there may be arcing between the collet and the workpiece which is detrimental to the welding operation.

It is, therefore, an object of the present invention to provide a collet of the type described which is inexpensive and easy to manufacture in contract to prior art collets.

Another object of the invention is to provide welding apparatus of the type described wherein the frontal surface of the collet is of less area than prior art devices, and therefore minimizes the probability of arcing due to the collection of spatter material on the collet.

SUMMARY OF THE INVENTION

The above objects, as well as other objects which will be apparent as the description proceeds are accomplished by providing an automatic electric welding gun for end welding buttons to a panel with a novel collet comprising a tubular member having an inner end disposed adjacent the feed chamber in the gun and an outer end extending from the wall structure of the gun. The tubular member comprises an internal surface having a larger diameter at the inner end than at the outer end and an internal surface which is of constant diameter for at least a portion of the distance from the outer end to provide an internal surface portion which is substantially normal to a work surface with the periphery of the outer end of the tubular member parallel with the work surface. The collet is generally formed of a unitary sheet of metallic material, such as spring steel, having a range of 0.010 – 0.050 inch thickness. The collet is also generally provided with a plurality of slots formed at the outer end and extending toward the inner end which may be three in number, including one which extends the entire length of the collet to provide spring action to the entire length of the collet.

BRIEF DESCRIPTION OF THE DRAWING

For a more complete understanding of the invention reference should be made to the accompanying drawing wherein:

FIG. 1 is an elevational view partially in section showing a stud welding device incorporating the teachings of the present invention;

FIG. 2 is a side elevational view partly in section showing an element of the structure of FIG. 1 in detail, taken on an enlarged scale for clarity;

FIG. 3 is a front elevational view showing details of the structure of FIG. 2; and FIG. 4 is an elevational view partially in section showing the element of FIGS. 2 and 3 in combination with the related structure of FIG. 1.

DESCRIPTION OF THE PREFERRED EMBODIMENT

Referring to the drawing and in particular to FIG. 1 there is shown an automatic electrode welding gun which, with the exception of those elements which are newly introduced and described herein below, may be similar in construction and operation to that described in U.S. Pat. No. 3,582,602 to Donald H. Ettinger and Englebert A. Meyer assigned to the assignee of the present invention.

As shown in FIG. 1 the welding gun 10 is provided with a collet holder 12, which is fastened to the body structure of the gun 10 by means of a fastener 14. The collet holder 12 has a central bore 16 formed therein which extends through the collet holder and provides an internal opening through which a ram 17 is received. The forward end of the collet holder 12 receives a collet 18 which extends forwardly through an arc shield 20.

The arc shield 20 is supported on the gun 10 by arc shield holder 22 mounted on a quick disconnect 24. The quick disconnect 24 is adapted for receiving a conduit through which the studs to be welded are delivered, one at a time, to the gun. The arc shield 20, as described in the aforementioned U.S. Pat. No. 3,582,602, is an insulative member which may be properly termed both a panel locator and an arc shield. That is to say, the tubular insulating arc shield 20 is both a panel locator and forms a shield preventing arcing between the stud to be welded and adjacent portions of the panel structure, lying outside the shield. The arc shield 20 therefore, is of a somewhat fixed diameter in order to maintain the welding arc within a desired area, defined by the periphery of the shield.

In operation, the stud is delivered through the conduit attached to the quick disconnect 24 and enters a chamber 26 formed in the wall structure of the collet holder 12. The ram 17 contacts the button and pushes it forward into the collet 18 to the outer end of the collet and in contact with the surface to which it is to be welded. The ram 17 also serves to carry the welding current to the button when the button is positioned to the outer end of the collet 18.

As referred to above, the operation of the welding gun 10 is similar to that described in the aforementioned U.S. Pat. No. 3,582,602 and reference may be had to that patent for a better understanding of the control arrangement and welding process.

Referring now to FIGS. 2 and 3, there is shown in detail the collet 18 which is formed of 0.020 inch thickness 1060 spring steel, but preferably may be in the range of 0.010 – 0.050 inch in thickness. The collet 18, as shown in FIG. 2, has an inner end 28 of larger diameter than an outer end 30 and a substantially constant diameter portion 31 extends from the inner end toward the outer end over a greater portion of the collet. The wall structure of the collet has a plurality of slots 32, 33 and 34 which extend from the outer end 30 toward the inner end 28. The slot 34 extends over the entire length of the collet 18 and is in effect formed by the edges of the unitary sheet used in forming the collet 18. The slot 34, therefore, provides flexibility over the whole area of the collet and in particular at the inner end of 28 which is received in the bore 16 of the collet holder 12.

At the outer end 30, each of the slots 32, 33 and 34 combine to retain the button head of a fastener B in gripping relation during the welding process, as shown in FIG. 1. The internal diameter of the collet at the outer end 30 being of slightly smaller diameter than the button head of the fastener in the relaxed condition, provides a gripping force on the button, the slots 32, 33 and 34 forming fingers which are resiliently flexible due to the relatively thin resilient sheet material employed in construction of the collet.

In addition to the constant diameter portion 31 of the collet 18, there is a tapered portion 36 terminating at a second constant diameter portion 38 at the outer end 30. The constant diameter portion 38 retains over its entire length the diameter at outer end 30 which is slightly less than a diameter of a button to be welded when the outer end of the collet 18 is in the relaxed or unstressed condition. Thus, the inner surface of the constant diameter portion 38 is normal to the plane of the surface to which the button is to be welded when the button is placed against the work surface and serves to retain the button in such normal position during the welding operation. The portion 38 has the effect of applying pressure over the entire surface of the head of the button to be welded, with the result that when the collet 18 is normal to the work surface, the button will likewise be normal to the work surface.

Adjacent the inner end 28 of the collet 18 there is provided a pair of detents 40 and 42 for retaining the collet 18 in the collet holder 12.

Referring to FIG. 4, it will be noted that the collet holder 12 has a groove 44 formed therein. To install the collet 18 into the collet holder 12, it is merely necessary to pinch the collet such that the detents 40 and 42 are received in the bore 16, and move the collet 18 into the bore until the detents snap into place in the groove 44. Removal of the collet also merely requires pinching the collet until the detents 40 and 42 are released from the groove 44, after which the collet may be removed through the bore 16.

From the foregoing, therefore, it should be evident that the present invention provides a novel collet which is simple and inexpensive to manufacture, easy to install and may be employed in welding guns of the type referred to above.

Additionally, as the diameter of the arc shield 20 is substantially fixed by the size of the button to be employed, the thin wall thickness of the collet produces a small outside collet diameter, and therefore increases the air gap between the collet and arc shield. The result is less splatter build up and a minimum of collet burnout and component failure. The relatively thin walls of the collet 18 also provide a limited front surface area on which buildup of flash material will take place.

Having thus described my invention and what I claim as new and desire to secure as Letters Patent of the United States is:

1. In combination with an automatic welding gun for end welding buttons to a panel, having wall structure defining a chamber into which a button is fed, and having a circular opening formed therein, a button retaining collet comprising a substantially circular tubular member formed of a unitary sheet of metallic material having an inner end extending through said opening in said wall structure, said tubular member further having a plurality of slots formed therein, each of said slots extending from the outer end toward said inner end and one of said slots extending the entire length of said member, said tubular member being formed with a larger diameter portion at its inner end than the diameter of said outer end, a plurality of detent elements spaced about the outer surface of said tubular member on said larger diameter portion and located adjacent said member inner end, said detent elements have portions extending beyond the limits of said circular opening formed in said chamber with said tubular member in the relaxed condition and said detent element portions extending within the limits of said circular opening with said tubular member compressed in the radial direction to close said one slotted opening, and means formed in said wall structure adjacent said circular opening for receiving said detent elements, whereby said inner end of said tubular member is insertable through said circular opening in said wall structure when radially compressed until said detent elements are aligned with said means for receiving said detent elements, and on release of radial compression said detent elements are received in said detent receiving means to inhibit removal of said tubular member from said circular opening.

2. The welding gun of claim 1 wherein the internal surface of said tubular member is of constant diameter for at least a portion of the distance from said outer end toward said inner end to provide an internal surface portion at said outer end of said collet which is substantially normal to a panel work surface with the periphery of said outer end of said tubular member parallel to the panel surface.

3. The welding gun of claim 1 wherein said sheet of metallic material is in the range of 0.010 to 0.050 inch in thickness.

4. The welding gun of claim 1 wherein said slots are equally spaced about the circumference of said tubular member and are three in number.

5. The welding gun of claim 4 which further includes a tubular insulating member surrounding the outer surface of said outer end of said collet and disposed in spaced relation therewith.

6. The welding gun of claim 5 which further includes ram means in the form of a rod aligned with the internal surface of said tubular member and mounted for reciprocating movement between said chamber and the interior of said tubular member for feeding buttons from said chamber toward the outer end of said tubular member.

7. A collet for use in an automatic stud welding gun having wall structure defining a chamber into which a button to be welded is fed and a circular opening through which the button is delivered from the chamber, the collet comprising a tubular member formed of a unitary sheet of metallic material having an inner end for insertion into the circular chamber opening, said tubular member further having a plurality of slots formed therein, each of said slots extending from the outer end toward said inner end and one of said slots extending the entire length of said member, said tubular member being formed with a larger diameter portion at its inner end than the diameter of its outer end, a plurality of detent elements spaced about the outer surface of said tubular member on said larger diameter portion and located adjacent said member inner end, said detent elements having portions extending beyond the limits of the circular opening formed in the chamber with said tubular member in the relaxed condition and said detent element portions extending within the limits of the chamber circular opening with said tubular member compressed in the radial direction to close said one slotted opening whereby said inner end of said tubular member is insertable through the circular opening in the chamber only when in the radially compressed condition.

8. The collet of claim 7 wherein the internal surface of said tubular member is of constant diameter for at least a portion of the distance from said outer end toward said inner end to provide an internal portion at said outer end of said collet which is substantially normal to a panel work surface with the periphery of said outer end of said tubular member parallel to the panel surface.

9. A collet as set forth in claim 7 wherein said sheet of metallic material is in the range of 0.010 inch and 0.050 inch in thickness.

10. A collet as set forth in claim 7 wherein said slots are equally spaced about the periphery of said tubular member and are three in number.

* * * * *